United States Patent [19]

Kunimune et al.

[11] Patent Number: 4,818,806

[45] Date of Patent: * Apr. 4, 1989

[54] PROCESS FOR PRODUCING HIGHLY ADHERENT SILICON-CONTAINING POLYAMIC ACID AND CORSSLINKED SILICON-CONTAINING POLYIMIDE

[75] Inventors: Kouichi Kunimune, Ichiharashi; Yoshiya Kutsuzawa; Hiromi Egawa, both of Yokohamashi; Shiro Konotsune, Yokosukashi, all of Japan

[73] Assignee: Chisso Corporation, Osaka, Japan

[*] Notice: The portion of the term of this patent subsequent to May 27, 2003 has been disclaimed.

[21] Appl. No.: 93,143

[22] Filed: Sep. 2, 1987

Related U.S. Application Data

[63] Continuation of Ser. No. 856,215, Apr. 28, 1986, abandoned.

[30] Foreign Application Priority Data

May 31, 1985 [JP] Japan .................... 60-117959

[51] Int. Cl.[4] .............................. C08G 77/04
[52] U.S. Cl. .................................. 528/26; 528/38; 525/431
[58] Field of Search ............... 528/26, 38; 525/431

[56] References Cited

U.S. PATENT DOCUMENTS

| | | | |
|---|---|---|---|
| 3,948,835 | 4/1976 | Greber et al. | 260/2 S |
| 4,499,252 | 2/1985 | Igarashi et al. | 528/38 |
| 4,562,119 | 12/1985 | Darms et al. | 528/38 |
| 4,591,653 | 5/1986 | Kunimune et al. | 556/419 |
| 4,609,700 | 9/1986 | Kunimune et al. | 524/104 |
| 4,656,238 | 4/1987 | Kunimune et al. | 528/26 |
| 4,672,099 | 6/1987 | Kunimune et al. | 525/431 |

FOREIGN PATENT DOCUMENTS 2101149 1/1983 United Kingdom .

*Primary Examiner*—Melvyn I. Marquis
*Attorney, Agent, or Firm*—Wenderoth, Lind & Ponack

[57] ABSTRACT

A process for producing a silicon-containing polyamic acid of a specified inherent viscosity as a precursor affording polyimide resins having a considerable extent of heat resistance as adhesives or resins for multilayer laminated composite materials, and a good adhesion onto inorganic materials, metals or resins, and a crosslinked silicon-containing polyimide resin prepared from the polyamic acid are provided, which process comprises reacting a tetracarboxylic acid dianhydride of formula (1) (A mols), a diamine of formula (2) (B mols) and an aminosilicon compound of formula (3) (C mols), satisfying the expressions of (4) and (5):

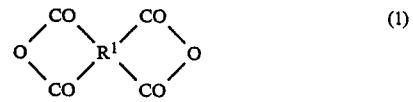

(1)

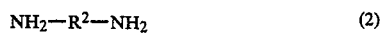

(2)

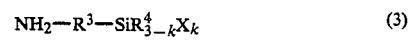

(3)

$$0.3 \leq \frac{C}{A-B} \leq 1.8 \quad (4)$$

$$0.1 \leq \frac{C}{B+C} \quad (5)$$

wherein $R^1$ is a tetravalent carboxylic aromatic group; $R^2$ is an aliphatic, alicyclic, aromatic aliphatic or carboyclic aromatic group each of a specified number of carbon atoms, a specified polysiloxane group, or a formula of

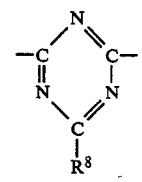

wherein $R^8$ is a specified hydrocarbon group or hydrogen atom;

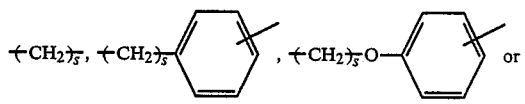

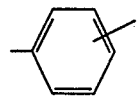

(s: 1 to 4); $R^4$ is alkyl, phenyl or alkyl-substituted phenyl each of a specified number of carbon atoms; X is alkoxy, acetoxy or halogen; and $1 \leq k \leq 3$, and which polyimide resin is produced by baking a solution containing the above polyamic acid at 50° to 450° C.

7 Claims, No Drawings

PROCESS FOR PRODUCING HIGHLY ADHERENT SILICON-CONTAINING POLYAMIC ACID AND CORSSLINKED SILICON-CONTAINING POLYIMIDE

This application is a continuation of application Ser. No. 856,215, filed Apr. 28, 1986, now abandoned.

BACKGROUND OF THE INVENTION

1. Field of the Invention

This invention relates to a process for producing a silicon-containing polyamic acid and also a process for producing a crosslinked silicon-containing polyimide.

2. Description of the Prior Art

Polyimide resins have so far been widely used for protecting materials, insulating materials and adhesives in the field of electronic equipment or films, structural materials, etc. mainly in the aspect of heat resistance.

Further, a process of making the above resins composite with other inorganic materials and using the resulting compositions as heat-resistant films, coating agents or adhesives has also been employed. In this case, if the inorganic materials are silicon-containing compounds such as glass, copolymers thereof with silicon compounds have often been proposed as a means for improving their adhesion. For example, Japanese patent application laid-open Nos. Sho 57-143328/1982, Sho 58-7473/1984 and Sho 58-13631/1984 propose a technique wherein a polyimide siloxane copolymer is prepared using a polyimide precursor obtained by replacing a portion of the raw material diamine component by a polysiloxane terminated with diamines at both ends thereof. In this case, however, although adhesion improvement to a certain extent is observed, a problem has been raised that the polymerization degree decreases with increase in the siloxane content in the copolymer, to reduce the coating-formability.

Further, Japanese patent publication Nos. Sho 58-18372/1983, Sho 58-32162/1983 and Sho 58-32163/1983 disclose a process wherein a suitable carboxylic acid derivative such as tetracarboxylic acid dianhydride is reacted with a diamine, to form a polyamidecarboxylic acid having a terminal group such as an acid anhydrides. One mol of this polyamidecarboxylic acid is reacted with at least two mols of an aminosilicon compound at $-20°$ C. to $+50°$ C., to obtain a silicon-containing polyamidecarboxylic acid prepolymer (a precursor), which is not imidized, or is imidized (chemically cyclized) under mild conditions (low temperature, preferably 50° C. or lower, particularly $-20°$ C. to $+25°$ C.) in the presence of a dehydrating agent to form an organic silicon-modified polyimide precursor. The former unimidized precursor or the latter polyimide precursor is heated (baked) in the form of a solution in the presence or absence of a silane diol or a siloxane diol to effect completion of imidization and also cross-linking, to thereby obtain a polyimide-siloxane. However, according to such a process, adhesion to silicon compounds is improved to a certain extent, but adhesion to e.g. aluminum is insufficient. Further, laminated coatings have often been practically formed as follows: a polymer solution is applied onto an object to be adhered, followed by baking it to form a coating, thereafter, again applying the same polymer solution onto the above coating and baking it to form a coating onto the former coating (such an adhesion will hereinafter be often referred to as "adhesion between coatings"). However, adhesion in such a case has been unsatisfactory.

Further, Japanese patent application laid-open No. Sho 57-212230/1982 discloses a molded product of a polyimide resin composition obtained by heating a polymer composition consisting of 99.9 to 70.0% by weight of a polyamic acid or a polyamide-amic acid and 0.1 to 30.0% by weight of a specified organic silicon compound. However, in this case, too, improvement in adhesion to silicon compounds is observed to a certain extent, but the above-mentioned adhesion between coatings has not been satisfactory.

As described above, the prior art has raised various problems. Thus, development has been desired of a polyimide resin or a precursor affording such a polyimide resin, having a considerable extent of heat resistance as adhesives or resins for multilayer laminated composite materials, and also having a good adhesion onto inorganic materials or metals and also a good adhesion of resins to each other.

The object of the present invention is to provide a means to solve the above-mentioned problems of the prior art and satisfying the above-mentioned desire.

SUMMARY OF THE INVENTION

The present invention in a first aspect resides in:

a process for producing a silicon-containing polyamic acid having an inherent viscosity of 0.05 to 5 dl/g as measured in a concentration of 0.5% by weight in a solvent at a temperature of $30\pm0.01°$ C., which process comprises reacting A mols of a tetracarboxylic acid dianhydride expressed by the following formula (1), B mols of a diamine expressed by the following formula (2) and C mols of an aminosilicon compound expressed by the following formula (3), satisfying the following expressions (4) and (5):

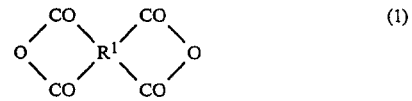 (1)

$$NH_2-R^2-NH_2 \quad (2)$$

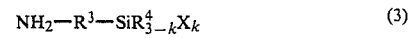 (3)

$$0.3 \leq \frac{C}{A-B} \leq 1.8 \quad (4)$$

$$0.1 \leq \frac{C}{B+C} \quad (5)$$

wherein in the formulas (1)–(3), $R^1$ represents a tetravalent carbocyclic aromatic group; $R^2$ represents an aliphatic group of 2 to 12 carbon atoms, an alicyclic group of 4 to 30 carbon atoms, an aromatic aliphatic group of 6 to 30 carbon atoms, a carbocyclic aromatic group of 6 to 30 carbon atoms, a polysiloxane group expressed by the formula (6) or a formula

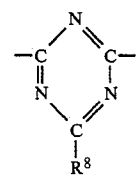

wherein $R^8$ represents an aliphatic group or an aromatic aliphatic group each of 8 carbon atoms or less or hydrogen atom;

$R^3$ represents

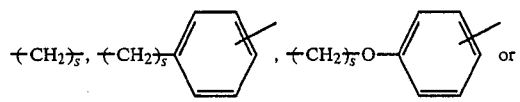

wherein s represents an integer of 1 to 4; $R^4$ independently represents an alkyl group of 1 to 6 carbon atoms, phenyl group or an alkyl-substituted phenyl group of 7 to 12 carbon atoms; X independently represents an alkoxy group, acetoxy group or a halogen atom; and k is a value of $1 \leq k \leq 3$:

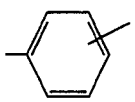

wherein $R^5$ independently represents

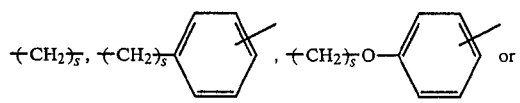

wherein s represents an integer of 1 to 4, $R^6$ independently represents an alkyl group of 1 to 6 carbon atoms, phenyl group or an alkyl-substituted phenyl group of 7 to 12 carbon atoms and l represents a value of $1 \leq l \leq 100$.

The present invention in a second aspect resides in:

a process for producing a crosslinked silicon-containing polyimide which process comprises baking a solution containing the silicon-containing polyamic acid obtained in the above first aspect of the present invention, at a temperature of 50° to 450° C. to thereby vaporize the solvent and at the same time effect crosslinking.

DESCRIPTION OF PREFERRED EMBODIMENTS

In the formation reaction of the silicon-containing polyamic acid according to the present invention, it is considered that polymers or oligomers composed mainly of compounds expressed by the following formulas (8) and (9) having an aminosilicon compound added at both the ends or one end of the polyamic acid or compounds expressed by the following formula (10) having no aminosilicon compound are obtained:

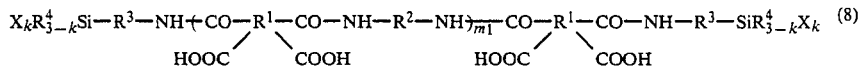

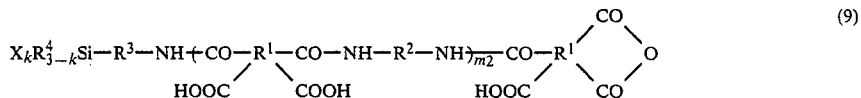

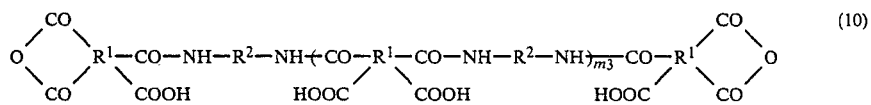

In the above formulas (8)~(10), $R^1$, $R^2$, $R^3$, $R^4$ and X are as defined above, and $m_1$, $m_2$ and $m_3$ each represent zero or a positive integer.

The suitable range of the average molecular weight of the silicon-containing polyamic acid obtained according to the present invention corresponds to an inherent viscosity value of 0.05 to 5 dl/g as measured under the above-mentioned specified conditions, and the polyamic acid is soluble in a suitable solvent.

The above inherent viscosity ($\eta_{inh}$) referred to herein is as defined under the above measurement conditions, and more particularly it refers to $$\eta_{inh} = \frac{\ln \eta/\eta_0}{C}$$

wherein $\eta$ refers to a value obtained by measuring the viscosity of a solution having a concentration of 0.5% by weight in a solvent having the same composition as that of the polymerization solvent at a temperature of 30°±0.01° C., using an Ubbellohde viscometer, $\eta_0$ refers to a measurement value of the same solvent at the same temperature and C refers to a concentration of 0.5 g/dl.

Next, the raw materials used in the present invention will be described.

Examples of the tetracarboxylic acid dianhydride expressed by the formula (1) are as follows:

pyromellitic acid dianhydride, 3,3',4,4'-biphenyltetracarboxylic acid dianhydride, 2,2',3,3'-biphenyltetracarboxylic acid dianhydride, 2,3,3',4'-biphenyltetracarboxylic acid dianhydride, 3,3',4,4'-benzophenonetetracarboxylic acid dianhydride, 2,3,3',4'-benzophenonetetracarboxylic acid dianhydride, 2,2',3,3'-benzophenonetetracarboxylic acid dianhydride, bis(3,4-dicarboxyphenyl)-ether dianhydride, bis(3,4-dicarboxyphenyl)-sulfone dianhydride, 1,2,5,6-naphthalenetetracarboxylic acid dianhydride, 2,3,6,7-naphthalenetetracarboxylic acid dianhydride, etc.

Further, examples of the diamine expressed by the formula (2) are as follows: aromatic diamines such as 4,4'-diaminodiphenyl ether, 4,4'-diaminodiphenylmethane, 4,4'-diaminodiphenylsulfone, 4,4'-diaminodiphenylsulfide, 4,4'-diaminodiphenyl thioether, 4,4'-di(m-aminophenoxy)diphenylsulfone, 4,4'-di(p-aminophenoxy)diphenylsulfone, o-phenylenediamine, m-phenylenediamine, p-phenylenediamine, benzidine, 2,2'-diaminobenzophenone, 4,4'-diaminobenzophenone, 4,4'-diaminodiphenyl-2,2-propane, 1,5-diaminonaphthalene, 1,8-diaminonaphthalene, etc., aliphatic diamines such as trimethylenediamine, tetramethylenediamine, hexamethylenediamine, 4,4-dimethylheptamethylenediamine, 2,11-dodecanediamine, etc., silicic diamines such as bis(p-aminophenoxy)dimethylsilane, 1,4-bis(3-aminopropyldimethylsilyl)benzene, etc., alicyclic diamines such as 1,4-diaminocyclohexane and aminoalkyl-substituted aromatic compounds such as o-xylylenediamine, m-xylylenediamine, etc., guanamines such as acetoguanamine, benzoguanamine, etc.

Further, examples of diaminopolysiloxanes having an amino group at both the ends thereof, expressed by the formula (6) are as follows:

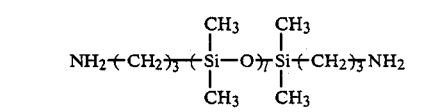

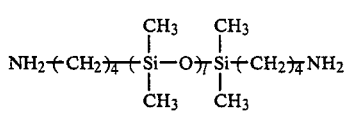

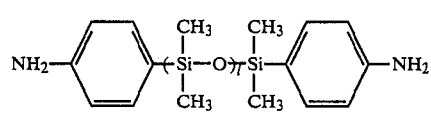

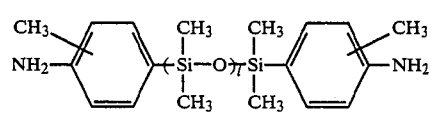

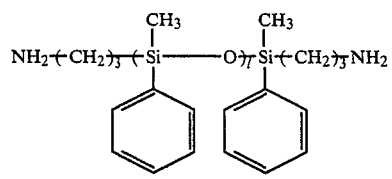

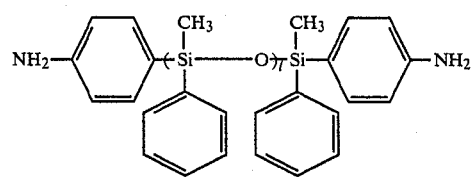

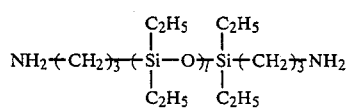

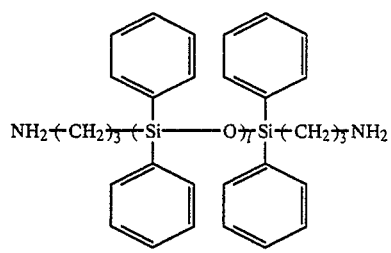

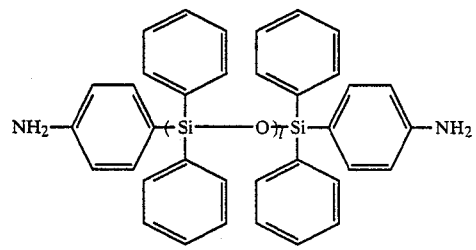

Next, examples of the aminosilicon compounds expressed by the formula (3) are as follows:

$NH_2\text{+}CH_2\text{+}_3Si(OCH_3)_3$,
$NH_2\text{+}CH_2\text{+}_3Si(OC_2H_5)_3$,
$NH_2\text{+}CH_2\text{+}_3Si(CH_3)(OCH_3)_2$,
$NH_2\text{+}CH_2\text{+}_3Si(CH_3)(OC_2H_5)_2$,
$NH_2\text{+}CH_2\text{+}_3Si(C_2H_5)(On\text{-}C_3H_7)_2$,
$NH_2\text{+}CH_2\text{+}_4Si(OCH_3)_3$,
$NH_2\text{+}CH_2\text{+}_4Si(OC_2H_5)_3$,
$NH_2\text{+}CH_2\text{+}_4Si(CH_3)(OC_2H_5)_2$,

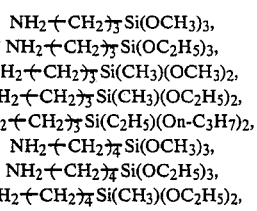

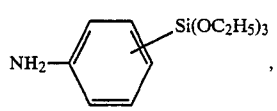

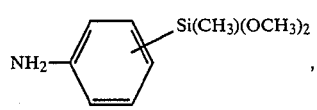

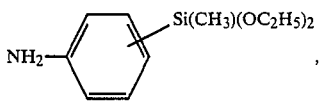

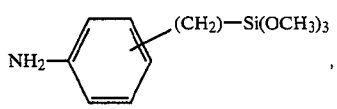

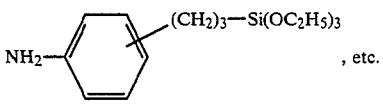

, etc.

Among the compounds expressed by the formula (3), aminosilane compounds expressed by the formula (7)

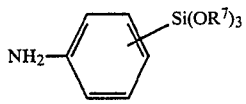

(7)

wherein R⁷ independently represents a methyl group or ethyl group, are preferred. This is because when the compounds are used, the coating obtained by baking the coating solution containing the silicon-containing polyamic acid obtained according to the process of the present invention, has a superior heat resistance and also a notably excellent hardness.

Examples of preferable solvents for reacting the raw material compounds in a solvent in the process of the present invention (hereinafter referred to as reaction solvent) are as follows: N-methyl-2-pyrrolidone, N,N-dimethylacetamide, N,N-dimethylformamide, dimethyl sulfoxide, tetramethylurea, pyridine, dimethyl sulfone, hexamethylphosphoroamide, methylformamide, N-acetyl-2-pyrrolidone, toluene, xylene, ethylene glycol monomethyl ether, ethylene glycol monobutyl ether, diethylene glycol monomethyl ether, diethylene glycol dimethyl ether, cyclopentanone, cyclohexanone, etc. These solvents may be used alone or in admixture, and also may be used in the form of a mixed solvent thereof with other solvents containing 30% by weight or more of the above solvents.

Next, the process of the formation reaction of the silicon-containing polyamic acid in the present invention will be described. A mols of a tetracarboxylic acid dianhydride expressed by the formula (1) are reacted with B mols of a diamine expressed by the formula (2) and C mols of an aminosilicon compound expressed by the formula (3) in a reaction solvent. At that time, A, B and C are determined so that the above relationships (4) and (5) may be present among them.

Namely, if $C/(A-B)$ is less than 0.3, the acid content is in excess of its necessary amount and the coating formed from the silicon-containing polyamic acid obtained by the reaction often has a non-smooth surface to reduce its practical value, and also its adhesion onto silicon compounds often is reduced. $C/(A-B)$ is preferred to be 1 or more. On the other hand, if $C/(A-B)$ exceeds 1.8, the coating formed from the silicon-containing polyamic acid obtained by the reaction is reduced in the adhesion onto aluminum plate, between coatings, etc.

If $C/(B+C)$ is less than 0.1, the total quantity of Si may be reduced, and the coating formed by baking the silicon-containing polyamic acid obtained by the above reaction may be reduced in adhesion onto silicon and silicon compounds.

The reaction solvent is preferred to be used in a quantity of 40% by weight or more based on the total quantity of the solvent and the raw materials added. If the quantity is less than the above, the stirring operation may be difficult.

The reaction may be carried out within a temperature range of 0° to 60° C., and within a reaction time range of 0.2 to 20 hours.

As to the addition order of the reaction raw materials to the reaction system, a tetracarboxylic acid dianhydride, a diamine and an aminosilicon compound may be totally added at the same time to the reaction solvent, and it is also possible to react the former two in advance and thereafter react an aminosilicon compound with the resulting reaction product. If an aminosilicon compound is finally added, a polymer having a higher molecular weight is liable to be obtained.

The reaction proceeds relatively rapidly to form a uniform and transparent reaction fluid. In such a manner, a silicon-containing polyamic acid is obtained which has an adequate inherent viscosity of 0.05 to 5 dl/g and hence an adequate molecular weight and is soluble in solvents.

If the inherent viscosity is less than 0.05 dl/g, the coating solution gives an inferior coated state and hence the coating formation is insufficient, while if it exceeds 5 dl/g, the polyamic acid is difficultly soluble or insoluble to make its practical use difficult.

In the above reaction, it is considered that compounds expressed by the above formulas (8), (9) and (10) are obtained as main products. When the compounds are coated onto the object to be coated and baked, the polyamidecarboxylic acid is dehydrated and cyclized to form an imide bond, and at the same time, X which is a hydrolyzable group present at the end of the molecule is brought into a high molecular weight by condensation reaction after hydrolysis to form a tought coating. The acid anhydride present at the end of the polyamic acid is considered to react with water i.e. formed water, or water present in the atmosphere to form a carboxylic acid. Only when the thus formed carboxylic acid and Si in the polymer are present within the ranges defined by the above expressions (4) and (5), then is possible to obtain a polyamic acid superior in the adhesion onto various kinds of substrates such as adhesion onto silicon compounds, metals and other inorganic compounds and adhesion between coatings.

Next, the manner in which the polyamic acid obtained according to the present invention is used will be described.

The polyamic acid obtained according to the present invention is used, in most cases, in solution state where it is dissolved in a solvent as in the case of varnishes, etc.; hence it is preferred to use the solution obtained according to the reaction process of the present invention by concentrating it or diluting it with a solvent. As the solvent, those which are the same as the above reaction solvents may be used. As the method of forming a molded product from the polyamic acid solution obtained according to the present invention, any known methods may be employed, for example, the polyamic acid solution is cast on a glass plate, copper plate, aluminum plate or the like, followed by heating (baking) to thereby remove the solvent, at the same time convert the amic acid bond into imide bond by dehydration and cause crosslinking by siloxane bonds to proceed, to form a hard and tough coating. In order to form a laminated composite material, it is possible to repeatedly carry out such an operation, or instead it is possible to obtain a laminated composite material by applying a varnish according to the present invention as an adhesive between a plurality of heterogeneous stocks, followed by baking.

When a varnish containing the polyamic acid produced according to the present invention is further coated onto a once baked and hardened coating, followed by baking, it is possible to laminate a coating onto the coating. When a filler or glass fibers are impregnated with a varnish, followed by baking and hardening, it is also possible to form a laminated material using a reinforced film.

The baking conditions vary depending on the solvent used, the thickness of coating, etc. but a temperature within a range of 50° to 450° C., preferably 200° to 400° C., more preferably 250° to 350° C., and a time within a range of about 0.5 to 1.5 hours may be sufficient.

As the application fields of the polyamic acid and the crosslinked silicon-containing polyimide obtained according to the process of the present invention, parts for electronic equipment, communication equipment, heavy electric equipment, transport equipment, etc. may be illustrated, and further, application fields for electronic materials such as a liquid crystal aligning agent also exhibit good results.

Since the silicon-containing polyamic acid produced according to the present invention has a suitable inherent viscosity, the viscosity of its solution is also suitable so that coating can be well carried out.

Further, when the polyamic acid produced according to the present invention is baked, siloxane bonding proceeds through condensation at the same time with imidization to form a hard and tough film through intermolecular bonds. At the same time, due to an adequate balance between the quantity of the carboxyl group formed from the acid anhydride present at the end of the polymer and the quantity of silicon, a superior adhesion not only onto silicon compounds such as glass, inorganic compounds such as copper plate, aluminum plate, etc., but also surprisingly enough onto the film itself consisting of crosslinked silicon-containing polyimide produced according to the present invention, is exhibited; thus such a good adhesion onto many kinds of substrates indicates that the polyamic acid exhibits superior characteristics as a material for multilayer composite materials or as adhesives.

The present invention will be further described in more detail by way of Examples and Comparative examples, but it should not be construed to be limited thereto.

EXAMPLE 1

A 1 l capacity flask equipped with a stirrer, a dropping funnel, a thermometer, a condenser and a nitrogen gas-purging means was fixed in cold water. After nitrogen gas purging inside the flask, dehydrated and purified dimethylacetamide (500 ml) and 4,4'-diaminodiphenyl ether (24.40 g, 0.121 mol) were fed into the flask, and while this solution was kept at 20°~25° C., 3,3',4,4'-benzophenonetetracarboxylic acid dianhydride (49.09 g, 0.152 mol) was added through the dropping funnel over 30 minutes, followed by carrying out reaction at the same temperature for 6 hours, thereafter adding p-aminophenyltrimethoxysilane (9.10 g, 0.0427 mol), and carrying out reaction at the same temperature for 2 hours and further at 45°~50° C. for 2 hoiurs to obtain a polyamic acid composition solution as a pale yellow transparent liquid, as the object product of the present invention. This solution had a rotational viscosity at 25° C. of 320 cp, and the polyamic acid contained in the solution had an inherent viscosity of 0.62 dl/g in dimethylacetamide.

The rotational viscosity referred to herein means a viscosity measured at 25° C. using an E type viscometer (VISCONIC EMD, tradename of a product manufactured by Tokyo Keiki Company) (this definition applies to the succeeding viscosity).

COMPARATIVE EXAMPLE 1

Reaction was carried out employing the same apparatus, process, raw materials and reaction conditions as those in Example 1 except that the quantities of 4,4'-diaminodiphenyl ether, 3,3',4,4'-benzophenonetetracarboxylic acid dianhydride and p-aminophenyltrimethoxysilane added were respectively changed to 23.31 g (0.116 mol), 46.90 g (0.146 mol) and 12.42 g (0.0582 mol), to obtain a pale yellow transparent solution having a rotational viscosity at 25° C. of A315 cp. The polyamic acid contained in the solution had an inherent viscosity of 0.62 dl/g in dimethylacetamide.

COMPARATIVE EXAMPLE 2

Employing the same apparatus and process as in Example 1, 4,4'-diaminodiphenyl ether (33.11 g, 0.165 mol) was fed into N-methyl-2-pyrrolidone (500 ml) kept at 10°~15° C. and dissolved therein, followed by adding to the solution, pyromellitic acid dianhydride (54.11 g, 0.248 mol) over 45 minutes, carrying out reaction at the same temperature for 2 hours and further at 25°~30° C. for 2 hours, thereafter adding 3-aminopropyltriethoxysilane (3.66 g, 0.0165 mol), and carrying out reaction at the same temperature for 8 hours to obtain a pale yellow, transparent solution having a rotational viscosity at 25° C. of 690 cp. The polyamic acid of the present invention contained in this solution had an inherent viscosity of 0.68 dl/g as measured in N-methyl-2-pyrrolidone. The varnish was coated onto various kinds of substrates and baked under the same conditions as those employed in Example 9 (baking temperature: 300° C.). As a result, all of the resulting coatings had a roughened surface and were whitened.

EXAMPLE 2

Employing the same apparatus and process as those in Example 1, 4,4'-diaminodiphenylmethane (29.20 g, 0.147 mol) was fed into N-methyl-2-pyrrolidone (500 ml) kept at 15°~20° C. and dissolved therein, followed by adding to the solution, pyromellitic acid dianhydride (36.13 g, 0.166 mol) over 30 minutes, carrying out reaction at the same temperature for 3 hours and further at 25°~30° C. for 2 hours, thereafter adding 3-aminopropyltrimethoxysilane (4.89 g, 0.0221 mol) and carrying out reaction at the same temperature for 10 hours, to obtain a pale yellow transparent solution having a rotational viscosity at 25° C. of 2,200 cp. The polyamic acid contained in this solution, an object of the present invention, had an inherent viscosity of 2.1 dl/g in N-methyl-2-pyrrolidone.

EXAMPLE 3

Employing the same apparatus and process as those in Example 1, 1,3-bis(aminomethyl)cyclohexane (29.88 g, 0.210 mol) was fed into N-methyl-2-pyrrolidone (500 ml) kept at 10°~15° C., followed by adding to the mixture, pyromellitic acid dianhydride (68.73 g, 0.315 mol) over one hour, carrying out reaction at the same temperature for 4 hours, thereafter adding 3-aminopropyltrimethoxysilane (30.12 g, 0.168 mol) and carrying out reaction at the same temperature for 5 hours and further at 50°~55° C. for one hour, to obtain a pale yellow transparent solution having a rotational viscosity at 25° C. of 241 cp. The polyamic acid contained in the solution, an object of the present invention, had an inherent viscosity of 0.33 dl/g in N-methyl-2-pyrrolidone.

COMPARATIVE EXAMPLE 3

Reaction was carried out using the same apparatus, process, raw materials and reaction conditions as those in Example 3 except that the quantities of 1,3-bis-(aminomethyl)cyclohexane, pyromellitic acid dianhydride and 3-aminopropyltrimethoxysilane added were respectively changed to 24.81 g (0.174 mol), 57.06 g (0.262 mol) and 46.88 g (0.262 mol), to obtain a pale yellow transparent solution having a rotational viscosity at 25° C. of 227 cp. The polyamic acid contained in this solution had an inherent viscosity of 0.35 dl/g in N-methyl-2-pyrrolidone.

EXAMPLE 4

Employing the same apparatus and process as those in Example 1, 4,4'-diaminodiphenylmethane (39.75 g, 0.200 mol) and p-aminophenyltrimethoxysilane (19.24 g, 0.0902 mol) were fed into N,N-dimethylformamide (500 ml) kept at 15°~20° C., followed by adding to the mixture, pyromellitic acid dianhydride (59.02 g, 0.271 mol) over 45 minutes, and carrying out reaction at the same temperature for 10 hours and further at 50°~55° C. for one hour, to obtain a pale yellow transparent solution having a rotational viscosity at 25° C. of 82 cp. The polyamic acid contained in this solution, an object of the present invention, had an inherent viscosity of 0.18 dl/g in N,N-dimethylformamide.

EXAMPLE 5

Employing the same apparatus and process as those in Example 1, 4,4'-diaminodiphenyl ether (10.46 g, 0.0522 mol) was fed into N,N-dimethylacetamide (500 ml) kept at 10°~15° C., followed by adding to the mixture, 3,3',4,4'-benzophenonetetracarboxylic acid dianhydride (16.82 g, 0.0522 mol) over 10 minutes, carrying out reaction at the same temperature for 3 hours, thereafter adding p-aminophenyltrimethoxysilane (89.16 g, 0.418 mol), thereafter again adding 3,3',4,4'-benzophenonetetracarboxylic acid dianhydride (84.18 g, 0.2612 mol), and carrying out reaction at the same temperature for 5 hours and further at 40°~45° C. for 2 hours, to obtain a pale yellow transparent solution having a rotational viscosity at 25° C. of 42 cp. The polyamic acid contained in this solution, an object of the present invention, had an inherent viscosity of 0.06 dl/g in N,N-dimethylacetamide.

EXAMPLE 6

Employing the same apparatus and process as those in Example 1, 4,4'-diaminodiphenylmethane (18.47 g, 0.0931 mol) and 1,3-bis(3-aminopropyl)-1,1,3,3-tetramethyldisiloxane (2.57 g, 0.0103 mol) were fed into N-methyl-2-pyrrolidone (500 ml) kept at 20°~25° C., followed by adding to the mixture, pyromellitic acid dianhydride (30.09 g, 0.138 mol) over 30 minutes, carrying out reaction at the same temperature for 10 hours, thereafter adding 3-aminopropyltriethoxysilane (12.22 g, 0.0552 mol), and carrying out reaction at the same temperature for 2 hours and further at 45°~50° C. for one hour, to obtain a pale yellow transparent solution having a rotational viscosity at 25° C. of 614 cp. The polyamic acid contained in this solution, an object of the present invention, had an inherent viscosity of 0.54 dl/g in N-methyl-pyrrolidone.

EXAMPLE 7

Employing the same apparatus and process as those in Example 1, 4,4'-diaminodiphenyl ether (39.82 g, 0.199 mol) and benzoguanamine (37.23 g, 0.199 mol) were fed into N-methyl-2-pyrrolidone (500 ml) kept at 25°~30° C., followed by adding to the mixture, pyromellitic acid dianhydride (108.45 g, 0.497 mol) over one hour, carrying out reaction at the same temperature for 6 hours, thereafter adding 3-aminopropyltriethoxysilane (35.23 g, 0.159 mol), and carrying out reaction at the same temperature for 2 hours and further at 55°~60° C. for one hour, to obtain a pale yellow transparent solution having a rotational viscosity at 25° C. of 123 cp. The polyamic acid contained in this solution, an object of the present solution, had an inherent viscosity of 0.10 dl/g in N-methyl-2-pyrrolidone.

EXAMPLE 8

Employing the same apparatus and process as those in Example 1, 3,3'-diaminodiphenylsulfone (42.17 g, 0.170 mol) and m-aminophenyltrimethoxysilane (5.43 g, 0.0255 mol) were fed into diethylene glycol dimethyl ether (500 ml) kept at 30°~35° C. and dissolved therein, followed by adding to the solution, 3,3',4,4'-benzophenonetetracarboxylic acid dianhydride (71.14 g, 0.221 mol) over one hour, and carrying out reaction at the same temperature further for 7 hours to obtain a yellow, transparent solution having a rotational viscosity at 25° C. of 320 cp. The polyamic acid of the present invention contained in this solution had an inherent viscosity of 0.49 dl/g as measured in diethylene glycol dimethyl ether.

COMPARATIVE EXAMPLE 4

Employing the same apparatus and process as those in Example 1, 4,4'-diaminodiphenylmethane (32.55 g, 0.164 mol) was fed into N-methyl-2-pyrrolidone (500 ml) kept at 20°~25° C., followed by adding 3,3',4,4'-benzophenonetetracarboxylic acid dianhydride (55.65 g, 0.173 mol) over 30 minutes, carrying out reaction at the same temperature for 3 hours, thereafter adding 3-aminopropyltriethoxysilane (2.68 g, 0.0121 mol), and carrying out reaction at the same temperature for one hour and further at 30°~35° C. for 1.5 hours, to obtain a pale yellow transparent solution having a rotational viscosity at 25° C. of 2,100 cp. The polyamic acid contained in the solution had an inherent viscosity of 1.6 dl/g in N-methyl-2-pyrrolidone.

For reference, the quantities A, B and C (mols) of the raw materials used in Examples 1~8 and Comparative examples 1~4, and C/(A−B) and C/(B+C) are shown in Table 1.

TABLE 1

| No. of Example & Compar. ex. | A [mol] | B [mol] | C [mol] | $\frac{C}{A-B}$ | $\frac{C}{B+C}$ |
|---|---|---|---|---|---|
| Example 1 | 0.152 | 0.121 | 0.0427 | 1.38 | 0.261 |
| Example 2 | 0.166 | 0.147 | 0.0221 | 1.16 | 0.131 |
| Example 3 | 0.315 | 0.210 | 0.168 | 1.60 | 0.444 |
| Example 4 | 0.271 | 0.200 | 0.0902 | 1.27 | 0.311 |
| Example 5 | 0.0522 +0.2612 =0.3134 | 0.0522 | 0.418 | 1.60 | 0.889 |
| Example 6 | 0.138 | 0.0931 +0.0103 =0.1034 | 0.0552 | 1.60 | 0.348 |
| Example 7 | 0.497 | 0.199 | 0.159 | 1.61 | 0.285 |

TABLE 1-continued

| No. of Example & Compar. ex. | A [mol] | B [mol] | C [mol] | $\frac{C}{A-B}$ | $\frac{C}{B+C}$ |
|---|---|---|---|---|---|
| | | +0.199 =0.398 | | | |
| Example 8 | 0.221 | 0.170 | 0.0255 | 0.500 | 0.130 |
| Compar. ex. 1 | 0.146 | 0.116 | 0.0582 | 1.94 | 0.334 |
| Compar. ex. 2 | 0.248 | 0.165 | 0.0165 | 0.199 | 0.0909 |
| Compar. ex. 3 | 0.262 | 0.174 | 0.262 | 2.98 | 0.601 |
| Compar. ex. 4 | 0.173 | 0.164 | 0.0121 | 1.34 | 0.0687 |

EXAMPLE 9

Adhesion tests were carried out as follows:

Various coating fluids obtained in the above Examples and Comparative examples 1, 3 and 4 were respectively coated onto the respective surfaces of slide glasses, aluminum plates and copper plates by means of a spinner, followed by preliminarily drying the fluids at 100° C. for one hour and thereafter baking at 300° C. for one hour to form a film 1~2 μm thick. However, the baking of the coating fluids of Example 3 and Comparative example 3 was carried out at 200° C. for one hour.

Further, adhesion tests between films have been made as follows: Onto the films formed on the slide glasses as described above in the case of the coating fluids of Examples 1~8 and Comparative examples 1 and 3, and onto the film formed on the aluminum plate as described above in the case of the coating fluid f Comparative example 4, were respectively coated the same coating fluids, followed by baking under the same conditions as above to form laminated coatings. The respective four kinds of the coatings prepared from the 11 kinds of the coating fluids obtained as above were notched into small pieces of a square having sides of 2 mm, followed by applying a cellophane tape onto the surface thereof and just thereafter peeling off the tape. The adhesion was expressed in terms of the number of small pieces of coatings peeled off at that time together with the cellophane taper per 100 small pieces prior to peeling off. The results are shown in Table 2. As apparent from the results, the polyamic acid of the present invention has a good adhesion onto many kinds of substrates.

TABLE 2

| Adhesion test No. | Coating fluid | Material of substrate | | | |
|---|---|---|---|---|---|
| | | Slide glass | Aluminum plate | Copper plate | Between films |
| 1 | Example 1 | 0 | 0 | 0 | 0 |
| 2 | Example 2 | 0 | 0 | 0 | 0 |
| 3 | Example 3 | 0 | 0 | 0 | 0 |
| 4 | Example 4 | 0 | 0 | 0 | 0 |
| 5 | Example 5 | 0 | 0 | 0 | 0 |
| 6 | Example 6 | 0 | 0 | 0 | 0 |
| 7 | Example 7 | 0 | 0 | 0 | 0 |
| 8 | Example 8 | 0 | 0 | 0 | 0 |
| 9 | Compar. ex. 1 | 0 | 30 | 20 | 100 |
| 10 | Compar. ex. 3 | 0 | 100 | 40 | 100 |
| 11 | Compar. ex. 4 | 100 | 0 | 0 | 0 |

EXAMPLE 10

The following hardness measurement tests were carried out:

Various coating fluids shown in Table 3 were respectively applied onto a slide glass by means of a spinner, followed by preliminarily drying these at 100° C. for one hour, thereafter baking at 200° C. for one hour or at 300° C. for one hour to form coatings 1~2 μm thick. The pencil hardness of the surface of the coatings (according to JIS K 5400) was measured. The results are shown in Table 3. As apparent from the results, the coatings using the varnishes obtained from the aminosilicon compounds expressed by the formula (7) have a great hardness.

Further, in view of the results of Example 9 and the chemical structure of the compound obtained, the polyamic acid compositions using the aminosilicon compounds expressed by the formula (7) among those of the present invention have a good adhesion to many kinds of substrates and also the coatings prepared therefrom have a very great hardness and are presumed to have a high heat-resistance; thus it can be said that their practical value is great.

TABLE 3

| Hardness test | Coating fluid | Pencil hardness | |
|---|---|---|---|
| | | 200° C. baking | 300° C. baking |
| 1 | Example 1 | 3H | 3H |
| 2 | Example 2 | H | H |
| 3 | Example 3 | H | — |
| 4 | Example 4 | 3H | 4H |
| 5 | Example 5 | 5H | 6H |
| 6 | Example 6 | H | H |
| 7 | Example 7 | H | H |
| 8 | Example 8 | 2H | 2H |
| 9 | Compar. ex. 1 | 4H | 5H |
| 10 | Compar. ex. 3 | HB | — |
| 11 | Compar. ex. 4 | H | H |
| 12 | *1 | HB | H |

*1: A conventional polyimide precursor obtained by the equimolar reaction of pyromellitic acid dianhydride with diaminodiphenyl ether.

What we claim is:

1. A process for producing a silicon-containing polyamic acid having an inherent viscosity of 0.05 to 5 dl/g as measured in a concentration of 0.5% by weight in a solvent at a temperature of 30±0.01° C., which process comprises either (a) reacting at least a part of A moles of a tetracarboxylic acid dianhydride expressed by the following formula (1) with B mols of a diamine expressed by the following formula (2), then adding to the resulting reaction product or mixture, C mols of an aminosilicon compound expressed by the following formula (3), and any remainder of the A moles of the same tetracarboxylic acid dianhydride, and reacting the resulting mixture, or (b) reacting A mols of a tetracarboxylic acid dianhydride expressed by the following formula (1) with a mixture of B mols of a diamine expressed by the following formula (2) and C mols of an aminosilicon compound expressed by the formula (3), wherein the moles A, B and C satisfy the following expressions (4) and (5):

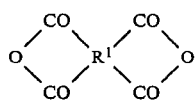 (1)

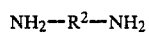 (2)

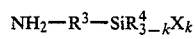 (3)

$$1 \leq \frac{C}{A-B} \leq 1.8 \quad (4)$$

$$0.1 \leq \frac{C}{B+C} \quad (5)$$

wherein $R^1$ represents a tetravalent carbocyclic aromatic group; $R^2$ represents a divalent group selected from the group consisting of (a) an aliphatic group of 2 to 12 carbon atoms, (b) an alicyclic group of 4 to 30 carbon atoms, (c) an aromatic aliphatic group of 6 to 30 carbon atoms, (d) a carbocyclic aromatic group of 6 to 30 carbon atoms, (e) a polysiloxane group expressed by the formula (6)

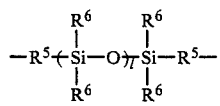 (6)

wherein each $R^5$ independently represents

 or 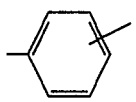

wherein s represents an integer of 1 to 4, each $R^6$ independently represents an alkyl group of 1 to 6 carbon atoms, a phenyl group or an alkyl-substituted phenyl group of 7 to 12 carbon atoms, and l represents a value of $1 \leq l \leq 100$, and (f) a group expressed by the formula

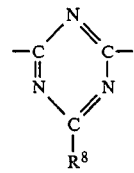

wherein $R^8$ represents an aliphatic group or an aromatic aliphatic group each of 8 carbon atoms or less, or a hydrogen atom; $R^3$ represents

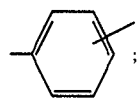 ;

each $R^4$ independently represents an alkyl group of 1 to 6 carbon atoms, a phenyl group or an alkyl-substituted phenyl group of 7 to 12 carbon atoms; each X independently represents an alkoxy group, an acetoxy group or a halogen atom; and k is a value of $1 \leq k \leq 3$.

2. A process according to claim 1 wherein said reaction is carried out in the presence of a reaction solvent in a quantity of 40% by weight or more based on the sum of the total weight of the raw materials for the reaction and the weight of the reaction solvent.

3. A process according to claim 1 wherein said reaction is carried out at a temperature in the range of 0° to 60° C.

4. A process according to claim 1 wherein said reaction is carried out for a time in the range of 0.2 to 20 hours.

5. A process according to claim 1 wherein said aminosilicon compound expressed by said formula (3) is a compound expressed by the following formula (7).

 (7)

wherein each $R^7$ independently represents a methyl group or ethyl group.

6. A process for producing a crosslinked silicon-containing polyimide, which process comprises baking a solution containing a silicon-containing polyamic acid produced according to the process of claim 1 and a solvent therefor at a temperature in the range of 50° to 450° C. to thereby vaporize the solvent and at the same time, effect crosslinking.

7. A process according to claim 6 wherein the baking temperature is in the range of 200° to 400° C.

* * * * *